United States Patent
Gerst et al.

(12) 
(10) Patent No.: US 6,423,769 B1
(45) Date of Patent: Jul. 23, 2002

(54) ACID FUNCTIONAL TWO-STAGE POLYMER DISPERSION WITH NEUTRALIZATION BETWEEN POLYMERIZATION STAGES

(75) Inventors: Matthias Gerst, Neustadt; Alexander Centner, Rödersheim-Gronau, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/460,438

(22) Filed: Dec. 14, 1999

(30) Foreign Application Priority Data

Dec. 15, 1998 (DE) .......................................... 198 57 876

(51) Int. Cl.$^7$ .......................... C08F 265/02; C09D 5/34; C09J 131/00; C09J 133/04; C09K 3/10
(52) U.S. Cl. ................. 524/460; 525/327.8; 525/330.2; 526/78; 526/87; 526/173; 526/203; 526/317.1
(58) Field of Search ...................... 524/460; 525/327.8, 525/330.2; 526/203, 78, 87, 173, 317.1

(56) References Cited

U.S. PATENT DOCUMENTS

| | | | |
|---|---|---|---|
| 5,114,991 A | * 5/1992 | Neubert | 523/201 |
| 5,476,897 A | 12/1995 | Freche et al. | |
| 5,567,773 A | * 10/1996 | McGee et al. | 525/221 |
| 5,614,049 A | * 3/1997 | Kohlhammer et al. | 156/221 |
| 5,739,196 A | * 4/1998 | Jenkins et al. | 524/460 |
| 5,744,540 A | * 4/1998 | Baumstark et al. | 524/558 |

FOREIGN PATENT DOCUMENTS

| | | | | |
|---|---|---|---|---|
| AU | 38692/95 | * 5/1996 | ............ | C08K/5/07 |
| DE | 196 32 203 | 2/1998 | | |
| EP | 609 756 | * 8/1994 | ......... | C09D/151/00 |
| WO | WO 98/16560 | 4/1998 | | |

OTHER PUBLICATIONS

Derwent Abstracts, AN 98–146412/14, DE 196 33 967, Feb. 26, 1998.
Derwent Abstracts, AN 1999–582798, DE 198 18 394, Oct. 28, 1999.

\* cited by examiner

*Primary Examiner*—David W. Wu
*Assistant Examiner*—Kelechi C. Egwim
(74) *Attorney, Agent, or Firm*—Oblon, Spivak, McClelland, Maier & Neustadt, P.C.

(57) ABSTRACT

An aqueous polymer dispersion wherein the polymer particles include at least two different water-insoluble polymers P and P', obtained by free-radical polymerization of ethylenically unsaturated monomers, which includes the following measures:

(1) polymerizing a first monomer mixture M by the method of free-radical aqueous emulsion polymerization to give a polymer P, wherein the polymerization is carried out in an aqueous reaction medium having a pH of less than 5, (2) adding a base to the dispersion of the polymer P to raise the pH of the dispersion by at least 2 pH units, and (3) polymerizing a further monomer mixture M', which is different from the monomer mixture M, in the dispersion of the polymer P, to give a polymer P', the monomer mixtures M and M' independently of one another including from 0.1 to 5% by weight, based on the total amount of the monomers M and M', respectively, of at least one monomer M1 which has at least one acid group and from 95 to 99.9 by weight of one or more monoethylenically unsaturated, essentially hydrophobic monomers M2, and wherein the polymerization of the first monomer in (1) is carried out to a conversion of at least 70% before the base is added in (2).

22 Claims, No Drawings

ACID FUNCTIONAL TWO-STAGE POLYMER DISPERSION WITH NEUTRALIZATION BETWEEN POLYMERIZATION STAGES

The present invention relates to aqueous polymer dispersions wherein the polymer particles comprise at least two different polymers, P and P'. The present invention also relates to the use of said polymer dispersions in adhesive formulations, especially in pressure-sensitive adhesives.

Aqueous polymer dispersions find diverse application, for example, as coating compositions or as impregnants for paper or leather, as binders in, for example, emulsion paints, filling compounds or synthetic-resin-bound plasters, as modifiers for mineral construction binders, and as adhesives or adhesive base materials.

Polymer dispersions are variously proposed wherein the polymer particles comprise at least two different polymers. Such polymer dispersions are generally prepared by first of all preparing an aqueous polymer dispersion and then in a further step conducting an addition polymerization of essentially hydrophobic monomers in said dispersion. This procedure is also referred to as staged polymerization. Staged polymerization produces aqueous polymer dispersions in which the polymer particles contain predominantly both the polymer of the first polymerization stage and the polymer of the second polymerization stage. Through such a combination of two polymers it is possible to improve the performance properties of. coating compositions. In the sector of pressure-sensitive adhesives, this concept has not to date led to the desired success.

A fundamental problem with adhesives is that for firm and dimensionally stable bonding of the substrates it is necessary to ensure good adhesion of the adhesive to the adherend substrate and at the same time internal strength (cohesion) of the adhesive film. Adhesion and cohesion cannot generally be optimized independently of one another. The desire is for measures which either raise the level of both properties or at least maintain one property unchanged while improving the other. This problem plays a particular part in the case of pressure-sensitive adhesives.

Pressure-sensitive adhesives (PSAs) form a permanently tacky film which adheres to a very wide variety of surfaces even—as their name suggests—under slight pressure at room temperature. PSAs are used to produce self-adhesive products, such as labels, tapes and sheets. Such products are very easy to use and make it possible to work rapidly when bonding. In contrast to contact adhesive compositions, no ventilation periods are required. Moreover, there is no "open time" within which the adhesive bond must be made. The quality of a self-adhesive article depends critically on whether the inner strength (cohesion) of the film of adhesive and its-adhesion to the surface on which the bond is to be produced are in tune with one another in accordance with the application.

In the case of PSAs for labels, in particular, the level of cohesion must be sufficient for no stringing or glue emergence at edges to occur in the course of stamping and cutting, since otherwise the cutting tools become soiled and the cut faces sticky. At the same time, the adhesion should be situated at a high level in order to provide good sticking on the substrate on which a bond is to be produced.

DE 196 33 967 discloses a process for preparing highly concentrated aqueous PSA dispersions, in accordance with which the polymerization is conducted using a special feed technique in the presence of less than 50 ppm of polymerization inhibitor.

DE 196 32 203 discloses pressure-sensitive adhesives whose adhesion is enhanced through the presence of small amounts of copolymerized styrene.

From the earlier Patent Application DE 198 18 394.1 it is known that the relationship of adhesion to cohesion in aqueous PSA formulations based on aqueous polymer dispersions can be improved by using aromatic emulsifiers.

WO 98/16560 and U.S. Pat. No. 5,476,897 disclose processes for preparing highly concentrated polymer dispersions where the pH is altered during the polymerization.

It is an object of the present invention to provide aqueous polymer dispersions which are particularly suitable as adhesives or adhesive base materials, i.e., as the adhesive component in adhesive formulations. The adhesives or adhesive formulations should have a balanced profile of properties, i.e., good adhesion of the adhesive to the adherend substrates in combination with high strength of the adhesive film.

We have found that this object is achieved and that polymer dispersions wherein the polymer particles comprise at least two different polymers P and P', have particularly advantageous properties when at least two different monomer mixtures comprising monomers having acid groups are polymerized in succession by the method of free-radical aqueous emulsion polymerization and a base is added during the changeover of polymerization stages.

The present invention accordingly provides aqueous polymer dispersions wherein the polymer particles comprise at least two mutually different water-insoluble polymers P and P', said dispersions being obtainable by free-radical addition polymerization of ethylenically unsaturated monomers, comprising the following measures:

1. polymerizing a first monomer mixture M by the method of free-radical aqueous emulsion polymerization to give a polymer P,
2. adding a base to the dispersion of the polymer P, and
3. polymerizing a further monomer mixture M', which is different from the monomer mixture M, in the dispersion of the polymer P, to give a polymer P', said monomer mixtures M and M' independently of one another comprising from 0.1 to 10% by weight, based on the total amount of the monomers M and M', respectively, of at least one monomer M1 which has at least one acid group and from 90 to 99.9% by weight of one or more essentially hydrophobic monomers M2. In the polymer dispersions of the invention, the polymer particles may also include more than two different water-insoluble polymers.

The weight ratio of monomer mixture M to monomer mixture M', and thus the weight ratio of polymer P to polymer P', is preferably in the range from 10:1 to 1:10, in particular in the range from 1:5 to 5:1 and, especially, in the range from 1:2 to 2:1.

Both the polymer P and the polymer P' normally have a glass transition temperature less than 60° C. The average glass transition temperature $\overline{T}_g$ of the polymer particles will generally not exceed 50° C. and preferably will not exceed 20° C. Where the polymers of the invention are used as adhesives, or as the adhesive component in adhesive formulations, both the polymer P and the polymer P' preferably have a glass transition temperature of less than 50° C., in particular less than 10° C., with particular preference less than 0° C., and with very particular preference in the range from −60° C. to −10° C. The average glass transition temperature $\overline{T}_g$ of the polymer particles in adhesive formulations will generally not exceed 50° C., preferably 10° C., in particular 0° C., and especially −10° C. $\overline{T}_g$ is especially in the range from −60° C. to −10° C.

It is of advantage in accordance with the invention if the glass transition temperature $T_g$ of the polymer P and the glass transition temperature $T_g'$ of the polymer P' differ from one another by at least 5 K. The difference in glass transition temperature can be up to 150 K. In the case of adhesives and adhesive formulations, especially pressure-sensitive adhesives, it has proven particularly advantageous for this difference to be in the range from 5 to 20 K and, in particular, in the range from 10 to 15 K. However, it is also possible for the glass transition temperatures to be approximately equal.

By the glass transition temperature $T_g$ here is meant the midpoint temperature determined by differential thermal analysis (DSC) in accordance with ASTM D 3418-82 (cf. Ullmann's Encyclopedia of Industrial Chemistry, 5th Edition, Volume A 21, VCH Weinheim 1992, p. 169, and Zosel, Farbe und Lack 82 (1976), pp. 125–134; see also DIN 53765). In addition, the glass transition temperature can also be determined from the measurement of the modulus of elasticity in the creep test as a function of temperature.

It often proves useful to estimate the glass transition temperature $T_g$ of the dispersed polymer. According to Fox (T. G. Fox, Bull. Am. Phys. Soc. (Ser. II) 1, 123 [1956] and Ullmanns Enzyklopädie der technischen Chemie, Weinheim (1980), pp. 17, 18) the glass transition temperature of copolymers at high molar masses is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the homopolymers of each of the monomers $1, 2, \ldots, n$, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

Monomers M1 according to the invention are all monomers having one or more acid groups which can be deprotonated by a base in the aqueous polymer medium. Examples of suitable monomers M1 are α,β-monoethylenically unsaturated mono- and dicarboxylic acids and also ethylenically unsaturated sulfonic acids, phosphonic acids or dihydrogen phosphates and water-soluble salts thereof, examples being their alkali metal salts. Preferred monomers M1 are α,β-monoethylenically unsaturated monocarboxylic acids having preferably 3 to 10 carbon atoms, examples being acrylic acid, methacrylic acid, crotonic acid, vinylacetic acid and acrylamidoglycolic acid, monoethylenically unsaturated dicarboxylic acids having preferably 4 to 10 carbon atoms, such as itaconic acid, and the monoesters of monoethylenically unsaturated dicarboxylic acids, examples being monomethyl maleate and monobutyl maleate. Particularly preferred monomers M1 are acrylic acid and methacrylic acid. Instead of or together with the abovementioned ethylenically unsaturated carboxylic acids it is also possible to use their anhydrides. Said monomers M1 in accordance with the invention make up from 0.1 to 10% by weight, preferably from 0.2 to 5% by weight and, in particular, from 0.5 to 2% by weight of the respective monomer mixture M or M1.

Customary monomers M2 are essentially hydrophobic monomers having a limited water solubility (generally less than 60 g/l at 25° C.) as conventionally used for free-radical aqueous emulsion polymerization. Typical monomers M2 are selected from vinylaromatic monomers such as styrene, α-methylstyrene, ortho-chlorostyrene or vinyltoluenes, vinyl esters of $C_1$–$C_{18}$, preferably $C_1$–$C_{12}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate, vinyl stearate and vinyl esters of Versatic® acids (Versatic®—acids are branched aliphatic carboxylic acids having 5 to 11 carbon atoms). Further suitable monomers M2 are esters of α,β-ethylenically unsaturated $C_3$–$C_{10}$ mono- or dicarboxylic acids with $C_1$–$C_{20}$, preferably $C_1$–$C_{12}$ and, in particular, $C_1$–$C_8$ alkanols or $C_5$–$C_8$ cycloalkanols. Examples of $C_1$–$C_{20}$ alkanols are methanol, ethanol, n-propanol, i-propanol, 1-butanol, 2-butanol, isobutanol, tert-butanol, n-hexanol, 2-ethylhexanol, n-decanol, lauryl alcohol and stearyl alcohol. Examples of suitable cycloalkanols are cyclopentanol and cyclohexanol. Examples of monomers of this kind are the alkyl acrylates and the alkyl methacrylates, such as methyl acrylate, ethyl acrylate, isopropyl acrylate, n-butyl acrylate, isobutyl acrylate, 1-hexyl acrylate, tert-butyl acrylate, 2-ethylhexyl acrylate, 2-lauryl acrylate, 2-stearyl acrylate, methyl methacrylate, ethyl methacrylate, isopropyl methacrylate, n-butyl methacrylate, isobutyl methacrylate, 1-hexyl methacrylate, tert-butyl methacrylate, 2-ethylhexyl methacrylate, 2-lauryl methacrylate, 2-stearyl methacrylate, and also the dialkyl esters of maleic acid, of itaconic acid or of fumaric acid, such as dimethyl maleate, di-n-butyl maleate and di-n-butyl fumarate. Further suitable monomers M2 are conjugated dienes having preferably 4 to 10 carbon atoms, such as 1,3-butadiene, isoprene or chloroprene, olefins having preferably 2 to 6 carbon atoms, such as ethylene, propene, 1-butene and isobutene, or vinyl chloride. Despite their increased solubility in water, the monomers M2 also include acrylonitrile and methacrylonitrile, the monomer mixtures M and M' independently of one another comprising these monomers, where desired, generally not alone but together with at least one other of the abovementioned monomers M2. The proportion of said monomers M2 in the monomer mixture M or M' according to the invention makes up from 90 to 99.9% by weight, preferably from 95 to 99.8% by weight and, in particular from 98 to 99.5% by weight of the respective monomer mixture M or M'.

The monomers M2 preferably include at least one monomer M2a whose homopolymer has a glass transition temperature according to Fox of less than 20° C. and at least one monomer M2b whose homopolymer has a glass transition temperature according to Fox of more than 30° C. In particular, the monomers M2 include at least one $C_2$–$C_{20}$-alkyl acrylate, especially a $C_2$–$C_{10}$-alkyl acrylate, as monomer M2a, said monomer being selected with particular preference from n-butyl acrylate and 2-ethylhexyl acrylate, and at least one monomer 2b selected from methyl acrylate, $C_1$–$C_4$-alkyl methacrylates, vinylaromatic monomers, and acrylonitrile and methacrylonitrile. Particularly preferred monomers M2b are styrene, methyl acrylate and methyl methacrylate.

Where the polymer dispersions of the invention are used as adhesives or in adhesive formulations, the monomers M2 preferably comprise i. from 70 to 95% by weight, in particular from 80 to 90% by weight, of monomers M2a, specifically n-butyl acrylate, 2-ethylhexyl acrylate and mixtures thereof, and ii. from 5 to 30% by weight, in particular from 10 to 20% by weight, of monomers M2b, especially methyl methacrylate, styrene, methyl acrylate and mixtures thereof.

Depending on the intended application it is also possible for the monomer mixtures M and M' independently of one another to include monomers different from the abovementioned monomers M1 and M2.

These include, in particular, neutral monomers M3 having an increased water solubility (i. e. >100 g/l at 25° C.), examples being amides and N-alkylolamides of the abovementioned carboxylic acids, such as acrylamide, methacrylamide, N-methylolacrylamide and N-methylolmethacrylamide, and also the hydroxyalkyl esters of the abovementioned ethylenically unsaturated carboxylic acids, such as hydroxyethyl acrylate, hydroxyethyl methacrylate, hydroxypropyl acrylate and hydroxypropyl methacrylate. These monomers can be present in the respective monomer mixtures in amounts of from 0.05 to 9.9% by weight, in particular in amounts of from 0.05 to 5% by weight.

Furthermore, it is possible for the monomer mixtures M and M' independently of one another to comprise crosslinking monomers M4 in copolymerized form. Such monomers, if desired, are used in minor amounts, i.e., in amounts of from 0.01 to 2% by weight, based on the respective total monomer amount M or M'. These monomers are preferably monomers having two nonconjugated ethylenically unsaturated bonds, examples being the diesters of dihydric alcohols with $\alpha,\beta$-monoethylenically unsaturated $C_3$–$C_8$ carboxylic acids, such as glycol bisacrylate, or esters of $\alpha,\beta$-unsaturated carboxylic acids with alkenols, such as bicyclodecenyl (meth)acrylate, and also divinylbenzene, N,N'-divinylurea, N,N'-divinylimidazolinone, diallyl phthalate etc. Preferably, neither the monomer mixture M nor the monomer mixture M' contains monomers M4.

Furthermore, the monomer mixture M and M' independently of one another can also include bifunctional monomers M5 which in addition to an ethylenically unsaturated double bond contain at least one glycidyl or carbonyl group. Examples of monomers M5 are ethylenically unsaturated glycidyl ethers and glycidyl esters, e.g., vinyl, allyl and methallyl glycidyl ether, glycidyl acrylate and glycidyl methacrylate, the anhydrides of $\alpha,\beta$-monoethylenically unsaturated mono- and dicarboxylic acids, the diacetonylamides of the abovementioned ethylenically unsaturated carboxylic acids, e.g., diacetone (meth)acrylamide, and the esters of acetylacetic acid with the abovementioned hydroxyalkyl esters of ethylenically unsaturated carboxylic acids, e.g., acetylacetoxyethyl (meth)acrylate. These monomers can be present in the respective monomer mixtures in amounts of from 0.05 to 9.9% by weight, in particular in amounts of from 0.05 to 5% by weight. Monomers M5 allow the after crosslinking of the polymers P of the invention with, for example, polyfunctional amines, hydrazides or alcohols.

In accordance with the invention, the monomer mixtures M and M' are different from one another. The nonidentity of the monomer mixtures lies in the fact that the monomer mixtures differ in the nature of the monomers they comprise and/or in the proportions of the monomers they each comprise. The monomers of the monomer mixtures M and M' are preferably substantially of the same nature so that the monomer mixtures differ essentially only in the proportions of the monomers. The monomer mixtures M and M' preferably differ in the nature of the monomers M2 and/or the amount of the monomers M2 and/or in the proportions of the monomers M2a to M2b. This results in the polymers P and P' having different glass transition temperatures.

Independently of this, the monomer mixtures M and M' may also differ, for example, in terms of the nature and/or amount of the monomers M1. For example, monomer mixture M' may include a larger amount of monomers M1 than the monomer mixture M. Where the polymer dispersions of the invention are employed as adhesives or in adhesive formulations, the monomer mixture M' preferably comprises more than 0.5% by weight, in particular from 0.5 to 5% by weight, based on the total amount of the monomers M', of at least one monomer M1. The monomer mixture M in that case contains preferably from 0.1 to 2% by weight, in particular from 0.2 to 1% by weight, based on the total amount of the monomers M, of at least one monomer M1.

Especially if the polymer dispersions of the invention are employed in pressure-sensitive adhesive formulations, the monomers mixtures M and M' may also differ in that the first monomer mixture M comprises small amounts, e.g., from 0.05 to 5% by weight, preferably from 0.1 to 4% by weight and, especially, from 0.5 to 3% by weight of at least one vinylaromatic monomer, especially styrene, and at least one further, different monomer M2b, and in that the monomer mixture M' contains essentially no vinylaromatic monomers.

Furthermore, it has been found advantageous for the polymer particles of the polymer P in the polymer dispersions of the invention to have an average particle diameter in the range from 50 to 1000 nm (determined by means of an ultracentrifuge or by photon correlation spectroscopy; on particle size determination see W. Mächtle, Angew. Makromolekulare Chemie 1984, Vol. 185, 1025–1039, W. Mächtle, loc. cit., 1988, Vol. 162, 35–42). In the case of formulations having high solids contents, such as >50% by weight, based on the total weight of the formulation, it is advantageous on viscosity grounds for the weight-average particle diameter of the polymer particles in the dispersion to be $\geq 100$ nm. The average particle diameter will preferably not exceed 800 nm. It has also proven favorable for the particle diameters of the individual polymer particles to vary over a wide range, and, in particular, for the size distribution to have two or more maxima (polymer dispersions having a bimodal or polymodal polymer particle size distribution). Measures to adjust the polymer particle size distribution are known to the skilled worker (see, for example, EP-A 614 922 and documents cited therein).

The solids content of the polymer dispersions of the invention is typically in the range from 30 to 75% by weight and, preferably, in the range from 40 to 70% by weight. For use in accordance with the invention it is of advantage for the solids content to be as high as possible, i.e., at least 50% by weight.

The polymer dispersions of the invention are prepared by the method of free-radical aqueous emulsion polymerization, which comprises the following measures:

1. polymerizing a first monomer mixture M by the method of free-radical aqueous emulsion polymerization to give a polymer P ($1^{st}$ polymerization stage),
2. adding a base to the resultant dispersion of the polymer P and
3. polymerizing a further monomer mixture M', which is different from the monomer mixture M, in the dispersion of the polymer P to give a polymer P' ($2^{nd}$ polymerization stage), the monomer mixtures M and M', and the polymers P and P', being subject to the comments made above. The measures 2. and 3. can also be carried out repeatedly, so giving aqueous polymer dispersions in which the polymer particles contain further polymers in addition to the polymers P and P'. Multistage polymer dispersions of this kind are likewise provided by the present invention.

The addition of the base between the polymerization stages is generally made when polymerization of the preceding polymerization stage is substantially at an end. The base is preferably not added until at least 70%, in particular at least 90% and especially 95% of the monomers to be polymerized in the respective polymerization stage have been supplied to the polymerization reaction. The polymerization of the monomer mixture M is preferably continued up to a conversion of 70%, in particular up to a conversion of 90% and, especially, up to a conversion of at least 95%, before the base is added.

The $1^{st}$ polymerization stage is preferably conducted at a pH of less than 5, in particular less than 4, and with very particular preference less than 3. The nature and amount of the base are chosen such that after the base has been added the pH of the aqueous polymerization medium rises by at least one pH unit and preferably by at least 2 pH units. Following the addition of the base the pH is preferably at least 5. In particular, the pH following the addition of the base is in the range from 6 to 12.

The amount of base used naturally depends on the amount of monomer M1 used in the first monomer mixture and on the nature of the initiator system. It is chosen such that the desired change in pH is achieved. in this context, the pH of the dispersion can be determined online or offline in a known manner.

Bases which can be used are in principle all bases suitable for neutralizing aqueous polymer dispersions, such as ammonia, low molecular mass amines, or water-soluble oxo bases. Preferred bases are selected from alkali metal oxides, hydroxides and carbonates, water-soluble alkaline earth metal oxides and hydroxides, and ammonia. Particularly preferred bases are sodium hydroxide and potassium hydroxide.

The base can be added as a solid. Preferably, the base is added in the form of a solution, especially an aqueous solution, to the polymerization mixture of the first polymerization stage. The base can be added over a prolonged period, for example, over the course of from 1 to 30 minutes. The addition of the base is preferably made in one portion.

The respective polymerization stages can be carried out either in the form of a batch process, i.e., with all of the monomer included in the initial charge, or else in the form of a feed process, including stage or gradient procedures. Preference is given to the feed process, in which the monomers in pure or emulsified form are supplied to the polymerization zone continuously, in stages or under a concentration gradient, during which the polymerization is maintained. In the case of the feed process, the individual components can be added to the reactor from above, through the side, or from below, through the reactor floor.

The polymerization stages 1 and 2 are generally conducted at temperatures in the range from 30 to 130° C., preferably in the range from 50 to 110° C.

Where the polymer dispersions of the invention are to be used as adhesives or in adhesive formulations, it has proven advantageous for polymerization of the monomer mixture M and, if appropriate, of the monomer mixture M' to be conducted in the presence of at least one molecular weight regulator. Typical amounts of regulator are in the range from 0.01 to 1% by weight, in particular from 0.02 to 0.3% by weight, based on 100% by weight of monomer mixture M and M'. In the two polymerization stages the amount of regulator can be the same or different. Typical molecular weight regulators are organic sulfur compounds, halogenated hydrocarbons, silanes, allyl alcohols, or aldehydes. Molecular weight regulators preferred in accordance with the invention are compounds having at least one thiol group such as thioglycolic acid, ethyl thioglycolate, mercaptoethanol, mercaptopropyltrimethoxysilane, and also linear or branched alkyl mercaptans such as tert-butyl mercaptan and tert-dodecyl mercaptan. The addition of the regulator to the polymerization vessel is made preferably continuously during the polymerization of the respective monomer mixture. Preferably, both the major amount of the monomers M to be polymerized and the major amount of the molecular weight regulator are supplied continuously to the polymerization reaction. The molecular weight regulator is preferably supplied continuously to the polymerization reaction in the form of a separate, preferably aqueous solution, or together with the monomers, for example, in an aqueous monomer emulsion.

Suitable free-radical polymerization initiators are, in principle, inorganic peroxides and hydroperoxides, examples being hydrogen peroxide, peroxodisulfates such as sodium peroxodisulfate, ammonium peroxodisulfate, and organic peroxides or hydroperoxides, an example being tert-butyl hydroperoxide, and also azo compounds. Preferred initiators are sodium peroxodisulfate or ammonium peroxodisulfate. Preference extends to redox initiator systems which are composed of at least one organic reducing agent and at least one peroxide and/or hydroperoxide. Examples thereof are combinations of tert-butyl hydroperoxide with ascorbic acid or with at least one sulfur compound, e.g., the sodium salt of hydroxymethanesulfinic acid, sodium sulfite, sodium disulfite, sodium thiosulfate or acetone-bisulfite adduct; or combinations of hydrogen peroxide with ascorbic acid or with at least one of the above-mentioned sulfur compounds. The redox initiator systems may also include a small amount of a metal compound which is soluble in the polymerization medium and whose metallic component is able to exist in a plurality of valence states: iron(II) sulfate alone or together with EDTA, vanadium salts, etc. The amount of the free-radical initiator systems employed, based on the total amount of the monomers to be polymerized in the respective polymerization stage, is preferably from 0.1 to 2% by weight.

The initiator can be either introduced completely in the initial charge to the polymerization vessel or else added, continuously or in stages, at the rate at which it is consumed in the course of the free-radical aqueous emulsion polymerization. In each individual case this will depend, as known to the skilled worker, on both the chemical nature of the initiator system and the polymerization temperature. Preferably, a portion of the initiator is included in the initial charge to the reaction vessel and the remainder is supplied to the polymerization vessel at the rate at which it is consumed.

Surface-active substances suitable for conducting the emulsion polymerization are the emulsifiers and protective colloids customarily employed for such purposes. The surface-active substances are conventionally used in amounts of up to 10% by weight, preferably from 0.1 to 5% by weight and, in particular, from 0.5 to 4% by weight, based on the monomers to be polymerized.

Examples of suitable protective colloids are polyvinyl alcohols, starch derivatives and cellulose derivatives, or vinylpyrrolidone copolymers. An exhaustive description of further suitable protective colloids is given in Houben-Weyl, Methoden der organischen Chemie, Volume XIV/1, Makromolekulare Stoffe [Macromolecular substances], Georg-Thieme-Verlag, Stuttgart 1961, pp. 411–420. Mixtures of emulsifiers and/or protective colloids can also be used. As surface-active substances it is preferred to employ exclusively emulsifiers, whose relative molecular weights, unlike the protective colloids, are usually below 2000. It is preferred to use at least one anionic emulsifier, alone or in combination with a nonionic emulsifier.

The anionic emulsifiers include alkali metal salts and ammonium salts of alkyl sulfates (alkyl: $C_8$–$C_{12}$), of dialkyl esters of sulfosuccinic acid (alkyl: $C_4$–$C_{10}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_{10}$), of alkylsulfonic acids (alkyl: $C_{12}$–$C_{18}$) and of alkylarylsulfonic acids (alkyl: $C_9$ to $C_{18}$). The anionic surface-active substances also include mono- and dialkyl derivatives of sulfonylphenoxybenzenesulfonic salts, especially of the sodium, potassium or calcium salts thereof. The alkyl groups in these compounds generally have 6 to 18 and, in particular, 6, 12 or 16 carbon atoms. It is common to use technical mixtures which contain a fraction of from 50 to 90% by weight of the monoalkylated product. These compounds are general knowledge, for example, from U.S. Pat. No. 4,269,749, and are obtainable commercially, for example, as Dowfax® 2A1 (trade mark of the Dow Chemical Company).

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, average degree of ethoxylation: 3 to 50) and, of these, particular preference to those based on oxo alcohols and naturally occurring alcohols having a linear or branched $C_{12}$–$C_{18}$ alkyl radical and a degree of ethoxylation of from 8 to 50.

Further suitable emulsifiers are given in Houben-Weyl, Methoden der organischen Chemie, Volume XIV/1, Makromolekulare Stoffe [Macromolecular substances], Georg-Thieme-Verlag, Stuttgart, 1961, pp. 192–208.

The surface-active substances used to prepare the polymer dispersions of the invention preferably comprise at least one anionic emulsifier. For the stability of the polymer dispersions of the invention, especially with respect to mechanical forces such as shearing, it has been found advantageous if the anionic emulsifiers preferably used to prepare the dispersions of the invention comprise at least one salt of a dialkyl ester of sulfosuccinic acid (linear or branched $C_4$–$C_{10}$ and, in particular, $C_8$ alkyl radical), preferably an alkali metal salt and, in particular, the sodium salt.

The polymerization medium can consist either of water alone or of mixtures of water and water-miscible organic liquids such as methanol, ethanol, n-propanol, isopropanol, n-butanol, tert-butanol, tetrahydrofuran, formamide, dimethylformamide, the proportion of these liquids, based on the polymerization medium, usually being less than 10% by weight. Preferably, water alone is used as the polymerization medium.

In addition to the seed-free mode of preparation, it is also possible for the emulsion polymerization to take place in accordance with the seed latex process, or in the presence of seed latex prepared in situ, in order to establish a defined polymer particle size. Methods of doing this are known and can be found in the prior art (see EP-B-40 419, EP-A-614 922, EP-A-567 812 and literature cited therein, and also 'Encyclopedia of Polymer Science and Technology', Vol. 5, John Wiley & Sons Inc., New York 1966, p. 847).

In the case of the seed latex process, the polymerization is conducted usually in the presence of from 0.001 to 3% by weight and, in particular, from 0.01 to 1.5% by weight of a seed latex (solids content of the seed latex, based on total monomer amount), preferably with seed latex included in the initial charge (initial-charge seed). The latex generally has a weight-average particle size of from 10 to 100 nm and, in particular, from 20 to 50 nm. Its constituent monomers are generally monomers M2, examples being styrene, methyl methacrylate, n-butyl acrylate and mixtures thereof, although the seed latex may also include in copolymerized form minor amounts of monomers M1 and/or M3, preferably less than 10% by weight, based on the total weight of the polymer particles in the seed latex.

In order to remove the residual monomers it is common to carry out a deodorization by physical means, e.g., by distillative removal of the volatile monomers using steam, or by chemical means following the final polymerization stage. In the case of chemical deodorization, further initiator, such as redox initiator, is added after the end of the emulsion polymerization proper, i.e., following monomer conversion of at least 95%, or after the residual monomer content has been lowered by physical deodorization to a level <5% by weight.

The solids content of the polymer dispersions of the invention is generally at least 30% by weight, preferably at least 40% by weight and, in particular, at least 50% by weight. It can be up to 75% by weight and with particular preference is in the range from 50 to 65% by weight.

The polymer dispersions of the invention are particularly suitable as adhesives and as an adhesive component, i.e., as an adhesive base material, for adhesive formulations, especially for aqueous adhesive formulations. Thus, the polymer dispersions of the invention are distinguished by a balanced proportion of the adhesion of the adhesive to the substrate that is to be bonded, and the inner strength of the adhesive film. This profile of properties makes the polymer dispersions of the invention particularly suitable as pressure-sensitive adhesives or as base materials for pressure-sensitive adhesives. Accordingly, the present invention also provides for the use of the aqueous polymer dispersions of the invention as adhesives and adhesive base materials, especially as pressure-sensitive adhesives.

The polymer dispersions of the invention can be used as they are or following formulation with conventional auxiliaries. Examples of conventional auxiliaries are wetting agents, thickeners, defoamers, plasticizers, pigments, fillers, protective colloids, light stabilizers, and biocides.

In the case of use as pressure-sensitive adhesives it is also possible to add tackifiers, i.e., tackifying resins, as auxiliaries to the polymer dispersions of the invention. Tackifiers are known, for example, from Adhesive Age July 1987, pp. 19–23, or Polym. Mater. Sci. Eng. 61, 1989, pp. 588 to 592. Examples of tackifiers are rosins and their derivatives. The rosins can be used, for example, in their salt form or, preferably, in esterified form. Further examples of tackifiers are hydrocarbon resins, e.g. coumarone resins, polyterpene resins, indene resins, and also hydrocarbon resins based on unsaturated hydrocarbons such as butadiene, pentene, methylbutene, isoprene, piperylene, divinylmethane, cyclopentene, cyclopentadiene, cyclohexene, cyclohexadiene, styrene or vinyltoluene. Further suitable tackifiers are low molecular mass polymers of alkyl esters of acrylic acid and/or methacrylic acid, which generally have a weight-average molecular weight of below 30,000 and are composed to the extent of at least 60% by weight, in particular at least 80% by weight, of alkyl (meth)acrylates. Preferred tackifiers are natural or chemically modified rosins. They consist predominantly of abietic acid or derivatives thereof.

Where desired, the tackifiers are used in amounts of up to 100% by weight, preferably from 5 to 50% by weight, based on the stage polymer of the invention in the adhesive formulation. The feature of the dispersions of the invention is that they can be used even without tackifiers.

The polymer dispersions of the invention can also be dried to form polymer powders in accordance with known processes of the prior art.

The pressure-sensitive adhesive formulations can be applied to substrates by conventional methods, such as by rolling, knifecoating, brushing, etc. The water present in the adhesive formulation can be removed by drying at ambient temperature or elevated temperature in the range, for example, from 50 to 150° C. Suitable substrates, other than paper and card, include polymer films, especially films of polyethylene, oriented polypropylene, or polyamide, which can have been biaxially or monoaxially oriented, polyethylene terephthalate, polyamide, polystyrene, polyvinyl chloride, polyacetate, cellophane, polymer films coated (by vapor deposition) with metal (e.g., aluminum) (metalized films for short) and metal foils, such as those of aluminum. Said films and foils can also be printed, for example, with printing inks. For subsequent use, the side of the substrate—for example, labels—that is coated with the pressure-sensitive adhesive can be lined with a release paper, such as with siliconized paper.

EXAMPLES

I. Preparation of the Polymer Dispersions P of the Invention as Aqueous Dispersions D1 and D2, and Comparative Dispersions CD1 to CD7

Comparative Dispersion CD1:
A polymerization reactor was charged with 100 g of deionized water and 0.28 g of polystyrene seed polymer (in the form of an aqueous dispersion; $d_{50}$=30 nm) and this initial charge was heated to 95° C. While maintaining the temperature, 10% of the initiator feed was added to the initial charge. After 5 minutes, while maintaining the temperature, the monomer feed and 75% of the remainder of the initiator feed were added to the polymerization reactor over the course of 180 minutes beginning at the same time. Subsequently, still while maintaining the polymerization temperature, the remaining amount of initiator was added over the course of 30 minutes. Then, at 95° C., 5.6 g of a 10% strength by weight aqueous tert-butyl hydroperoxide solution and 7.5 g of an aqueous solution of the sodium bisulfite adduct of acetone (12% strength) were added. The mixture was subsequently cooled to room temperature and the dispersion was neutralized to a pH of 7 using 15% strength by weight sodium hydroxide solution. The solids content of the dispersion was from about 55 to 57% by weight.

Monomer Feed: Aqueous Emulsion of
  110.0 g of deionized water
  235.2 g of n-butyl acrylate
  40.6 g of methyl acrylate
  1.4 g of acrylic acid
  2.8 g of styrene
  6.2 g of emulsifier solution
  0.2 g of tert-dodecyl mercaptan
  Emulsifier solution: 45% strength by weight aqueous solution of sodium dodecylphenoxybenzenedisulfonate (DOWFAX® 2A1 from DOW CHEMICAL)
Initiator Feed:
  20 g of a 7% strength by weight solution of sodium peroxodisulfate in water Comparative Dispersion CD2:
In analogy to comparative dispersion CD1, a comparative dispersion CD2 was prepared with the following, different monomer composition:
Monomer feed: Aqueous Emulsion of
  110.0 g of deionized water
  233.8 g of n-butyl acrylate
  42.0 g of methyl methacrylate
  4.2 g of acrylic acid
  6.2 g of emulsifier solution
  0.14 g of tert-dodecyl mercaptan Comparative Dispersion CD3:
The polymer dispersion CD3 was prepared in the manner described for CD1 by polymerizing a mixture of 50 parts by weight of the monomer emulsion used in CD1 and 50 parts by weight of the monomer emulsion used in CD2.

Comparative Dispersion CD4:
A polymerization reactor was charged with 200 g of deionized water and 0.56 g of polystyrene seed polymer (in the form of an aqueous dispersion; $d_{50}$=30 nm) and this initial charge was heated to 95° C. While maintaining the temperature, 10% of the initiator feed was added to the initial charge. After 5 minutes, while maintaining the temperature, monomer feed 1 was added over the course of 90 minutes and, over the course of 180 minutes, first 75% and then, over the course of 30 minutes, while maintaining the 95° C., the remaining 25% of the residual initiator feed were added to the polymerization reactor, the first two feeds beginning concurrently. After the end of the monomer feed 1, monomer feed 2 was added to the polymerization vessel over the course of 90 minutes. After the end of the initiator feed, at 95° C., 5.6 g of a 10% strength by weight aqueous tert-butyl hydroperoxide solution and 7.5 g of an aqueous solution of the sodium bisulfite adduct of acetone (12% strength) were added. The mixture was subsequently cooled to room temperature and the dispersion was neutralized to a pH of 7 using 15% strength by weight sodium hydroxide solution. The solids content of the dispersion was from about 55 to 57% by weight.

Monomer Feed 1: Aqeuous Emulsion of
  110.0 g of deionized water
  235.2 g of n-butyl acrylate
  40.6 g of methyl acrylate
  1.4 g of acrylic acid
  2.8 g of styrene
  6.2 g of emulsifier solution 1
  0.2 g of tert-dodecyl mercaptan Monomer Feed 2: Aqeuous Emulsion of
  110.0 g of deionized water
  233.8 g of n-butyl acrylate
  42.0 g of methyl methacrylate
  4.2 g of acrylic acid
  6.2 g of emulsifier solution
  0.14 g of tert-dodecyl mercaptan
  Emulsifier solution: 45% strength by weight aqueous solution of sodium dodecylphenoxybenzenedisulfonate (DOWFAX® 2A1 from DOW CHEMICAL)
Initiator Feed: Solution of
  2.8 g of sodium peroxodisulfate in
  37.2 g of water Dispersion D1:
The dispersion D1 of the invention was prepared in analogy to comparative dispersion CD4. Following the end of the addition of feed stream 1 and before beginning the addition of feed stream 2, 8.4 g of 10% strength by weight sodium hydroxide solution were added to the polymerization vessel in one portion. The pH of the reaction mixture changed from 2.0 to 6.0. The pH following neutralization was 7. The solids content was from 55 to 57% by weight.

Comparative Dispersion CD5:
In analogy to comparative dispersion CD1, a comparative dispersion CD5 was prepared with the following, different monomer composition:
Monomer Feed: Aqueous Emulsion of
- 110.0 g of deionized water
- 190.4 g of n-butyl acrylate
- 42.0 g of 2-ethylhexyl acrylate
- 40.3 g of methyl acrylate
- 5.6 g of styrene
- 1.7 g of acrylic acid
- 6.2 g of emulsifier solution
- 0.2 g of tert-dodecyl mercaptan Comparative Dispersion CD6:
In analogy to comparative dispersion CD1, a comparative dispersion CD6 was prepared with the following, different monomer composition:
Monomer Feed: Aqueous Emulsion of
- 110.0 g of deionized water
- 156.8 g of n-butyl acrylate
- 77.0 g of 2-ethylhexyl acrylate
- 42.0 g of methyl methacrylate
- 4.2 g of acrylic acid
- 6.2 g of emulsifier solution
- 0.14 g of tert-dodecyl mercaptan Comparative Dispersion CD7:
In analogy to comparative dispersion CD4, a comparative dispersion CD7 was prepared with the following, different monomer composition:
Monomer Feed 1: Aqueous Emulsion of
- 110.0 g of deionized water
- 190.4 g of n-butyl acrylate
- 42.0 g of 2-ethylhexyl acrylate
- 40.0 g of methyl acrylate
- 5.6 g of styrene
- 1.7 g of acrylic acid
- 6.2 g of emulsifier solution
- 0.2 g of tert-dodecyl mercaptan Monomer Feed 2: Aqueous Emulsion of
- 110.0 g of deionized water
- 156.8 g of n-butyl acrylate
- 77.0 g of 2-ethylhexyl acrylate
- 42.0 g of methyl methacrylate
- 4.2 g of acrylic acid
- 6.2 g of emulsifier solution
- 0.14 g of tert-dodecyl mercaptan Dispersion D2:
The dispersion D2 of the invention was prepared in analogy to comparative dispersion CD8. Following the end of the addition of feed stream 1 and before beginning the addition of feed stream 2, 9.8 g of 10% strength by weight sodium hydroxide solution were added to the polymerization vessel in one portion. The pH of the reaction mixture changed from 2.0 to 6.5.
The pH of the finished dispersion following neutralization with sodium hydroxide solution was about 7. The solids content was from 55 to 57% by weight.

II. Test Methods a) Producing the Test Strips
The dispersion to be tested is investigated without the addition of tackifiers. The mixture is applied in a thin film to a siliconized paper, using a coating bar, and dried at 90° C. for 3 minutes. The gap size of the coating bar is chosen so as to give an application rate of from 19 to 21 g/m² for the dried adhesive. Commercial polypropylene film (OPP film; thickness 30 μm, Corona-pretreated) is placed onto the dried adhesive and rolled down firmly using a manual roller. The film laminate produced in this way is cut into strips measuring 2.5 cm in width. Prior to the test, these strips are stored under standardized conditions for at least 24 h.

b) Testing the Shear Strength (K, in Accordance with FINAT FTM 7)
After the siliconized paper has been peeled off, the test strip is bonded to the edge of a metal test panel from Afera so as to give a bond area of 1.56 cm². 10 minutes after bonding, a 1000 g weight is fastened to the protruding end of the film and the metal test panel is suspended vertically. Ambient conditions: 23° C., 50% relative atmospheric humidity. The shear strength is taken as the time, in minutes, until the adhesive bond fails under the effect of the weight, as the mean of the results from three test specimens.

c) Testing the Peel Strength (in Accordance with FINAT FTM 1)
After the siliconized paper has been peeled off, a 2.5 cm wide test strip is bonded to a metal test panel from Afera and to a cardboard test piece (test liner). Ambient conditions: 230° C., 50% relative atmospheric humidity. 1 minute after bonding, the strip is peeled off at an angle of 180° at a rate of 300 mm/min with the aid of a tensile tester. The peel strength is taken to be the force, in N/2.5 cm, required for this peeling, as the mean of the results from three test specimens.

The results of the test methods for dispersions CD1 to CD4 and D1 are given in Table 1, the results for dispersions CD5 to CD7 and D2 in Table 2.

TABLE 1

| Dispersion | Preparation | Peel strength [N/25 mm] | | Shear strength [min] |
|---|---|---|---|---|
| | | Afera | Test liner | |
| CD1 | single stage | 13.1 | 9.6 | 2 |
| CD2 | single stage | 3.3 | 3.5 | 69 |
| CD3 | mixture of monomer emulsion CD1 + CD2 | 5.0 | 4.5 | 20 |
| CD4 | two-stage without base | 5.5 | 5.7 | 6 |
| D1 | two-stage with base | 5 | 4.5 | 43 |

TABLE 2

| Dispersion | Preparation | Peel strength [N/25 mm] | | Shear strength [min] |
|---|---|---|---|---|
| | | Afera | Test liner | |
| CD5 | single stage | 7.3 | 7.8 | 3 |
| CD6 | single stage | 3.5 | 3.2 | 32 |
| CD7 | two-stage without added base | 6.0 | 4.4 | 9 |

TABLE 2-continued

| Dispersion | Preparation | Peel strength [N/25 mm] Afera | Peel strength [N/25 mm] Test liner | Shear strength [min] |
|---|---|---|---|---|
| D2 | two-stage with base added | 4.8 | 4.0 | 38 |

We claim:

1. An aqueous polymer dispersion wherein the polymer particles comprise at least two different water-insoluble polymers P and P', obtained by free-radical polymerization of ethylenically unsaturated monomers, comprising the following measures:

(1) polymerizing a first monomer mixture M by the method of free-radical aqueous emulsion polymerization to give a polymer P, wherein the polymerization is carried out in an aqueous reaction medium having a pH of less than 5, (2) adding a base to the dispersion of the polymer P to raise the pH of the dispersion by at least 2 pH units, and (3) polymerizing a further monomer mixture M', which is different from the monomer mixture M, in the dispersion of the polymer P, to give a polymer P', said monomer mixtures M and M' independently of one another comprising from 0.1 to 5% by weight, based on the total amount of the monomers M and M', respectively, of at least one monomer M1 which has at least one acid group and from 95 to 99.9 by weight of one or more monoethylenically unsaturated, essentially hydrophobic monomers M2, and wherein the polymerization of the first monomer in (1) is carried out to a conversion of at least 70% before the base is added in (2).

2. An aqueous polymer dispersion as claimed in claim 1, wherein the glass transition temperature $T_g$ of the polymer P and the glass transition temperature $T_g'$ of the polymer P' differ from one another by at least 5 K.

3. An aqueous polymer dispersion as claimed in claim 1, wherein the relative amount of monomer M1 in the monomer mixture M is different from the relative amount of monomer M1 in the monomer mixture M'.

4. An aqueous polymer dispersion as claimed in claim 1, wherein the average glass transition temperature $\overline{T}_g$ of the-polymer particles is not more than 50° C.(determined by means of DSC).

5. An aqueous polymer dispersion as claimed in claim 1, wherein the monomers M2 comprise:

at least one $C_2$–$C_{20}$-alkyl acrylate and at least one further monomer selected from methyl acrylate, $C_1$–$C_4$-alkyl methacrylates, vinylaromatic monomers, acrylonitrile and methacrylonitrile.

6. An aqueous polymer dispersion as claimed in claim 1, wherein the weight ratio of the monomer mixture M to the monomer mixture M' is in the range from 10:1 to 1:10.

7. An aqueous polymer dispersion as claimed in claim 1, wherein the monomer M1 is selected from monoethylenically unsaturated mono- and dicarboxylic acids.

8. An aqueous polymer dispersion as claimed in claim 1, wherein the base is selected from alkali metal oxides, hydroxides and carbonates, water-soluble alkaline earth metal oxides and hydroxides, and ammonia.

9. A process for preparing an aqueous polymer dispersion as claimed in claim 1, comprising the following measures:

(1) polymerizing a first monomer mixture M by the method of free-radical aqueous emulsion polymerization to give a polymer P, wherein the polymerization is carried out in an aqueous reaction medium having a pH of less than 5, (2) adding a base to the dispersion of the polymer P to raise the pH of the dispersion by at least 2 pH units, and (3) polymerizing a further monomer mixture M', which is different from the monomer mixture M, in the dispersion of the polymer P, to give a polymer P', said monomer mixtures M and M' independently of one another comprising from 0.1 to 5% by weight, based on the total amount of the monomers M and M', respectively, of at least one monomer M1 which has at least one acid group and from 95 to 99.9 by weight of one or more monoethylenically unsaturated, essentially hydrophobic monomers M2, and wherein the polymerization of the first monomer in (1) is carried out to a conversion of at least 70% before the base is added in (2).

10. A process as claimed in claim 9, wherein the polymerization of the first monomer mixture is carried on to a conversion of at least 90%, before the base is added.

11. An aqueous adhesive formulation comprising at least one aqueous polymer dispersion as claimed in claim 1.

12. A method of impregnating paper and leather, the method comprising the application of an aqueous polymer dispersion as claimed in claim 1 to leather or paper.

13. A coating composition, containing as a binder at least one aqueous polymer dispersion as claimed in claim 1.

14. A filling composition, containing as a binder at least one aqueous polymer dispersion as claimed in claim 1.

15. A synthetic resin bound plaster containing as a binder at least one aqueous polymer dispersion as claimed in claim 1.

16. An aqueous adhesive formulation as claimed in claim 11 which is a pressure-sensitive adhesive.

17. A process as claimed in claim 9, wherein the polymerization of the first monomer mixture M is carried out at a pH of the aqueous reaction medium of less than 4 and the polymerization of the further monomer mixture M' is carried out a pH of the aqueous reaction medium of 5 to 12.

18. An aqueous polymer dispersion as claimed in claim 1, wherein the glass transition temperatures of both the polymer P and the polymer P' do not exceed 0° C.

19. An aqueous polymer dispersion as claimed in claim 1, wherein a relative amount of monomers M1 in the monomer mixture M which forms the polymer P is from 0.1 to 2% by weight, based on the total amount of monomers M.

20. An aqueous adhesive composition, comprising at least one aqueous polymer dispersion as claimed in claim 18.

21. An aqueous polymer dispersion as claimed in claim 1, wherein the monomer mixtures M and M' independently of one another comprise from 0.1 to 2% by weight, based on the total amount of the monomers M and M', respectively, of the monomer M1 which has at least one acid group.

22. A process as claimed in claim 9, wherein the monomer mixtures M and M' independently of one another comprise from 0.1 to 2% by weight, based on the total amount of the monomers M and M', respectively, of the monomer M1 which has at least one acid group.

* * * * *